United States Patent [19]

Dickinson

[11] Patent Number: 5,173,960
[45] Date of Patent: Dec. 22, 1992

[54] CABLE HAVING SUPERIOR RESISTANCE TO FLAME SPREAD AND SMOKE EVOLUTION

[75] Inventor: Paul R. Dickinson, Lawrenceville, Ga.

[73] Assignee: AT&T Bell Laboratories, Murray Hill, N.J.

[21] Appl. No.: 847,547

[22] Filed: Mar. 6, 1992

[51] Int. Cl.$^5$ .............................................. G02B 6/44
[52] U.S. Cl. .................. 385/100; 174/68.1; 174/121 A
[58] Field of Search ................. 385/100–114; 174/68.1, 121 A

[56] References Cited

U.S. PATENT DOCUMENTS

| | | | |
|---|---|---|---|
| 4,079,022 | 3/1978 | Ferrarini, Jr. et al. | 260/2.5 |
| 4,273,821 | 6/1981 | Pedlow | 428/215 |
| 4,543,281 | 9/1985 | Pedersen et al. | 428/36 |
| 5,016,973 | 5/1991 | Hager et al. | 350/96.23 |
| 5,074,640 | 12/1991 | Hardin et al. | 385/109 |

FOREIGN PATENT DOCUMENTS

| | | |
|---|---|---|
| 0248404 | 12/1987 | European Pat. Off. |
| 0349320 | 1/1990 | European Pat. Off. |
| 2138168 | 10/1984 | United Kingdom |
| 2220208 | 1/1990 | United Kingdom |

OTHER PUBLICATIONS

"Recent Advances In Flame Retardancy of Polymeric Materials", vol. II, Buss, Communications Co., Inc., CT, May, 1991, pp. 87–93.

"Ceepree Fire Barrier Filler", Soda Ash Products, Sep. 1989.

"Ceepree Unique Fire Barrier From a Versatile Filler", ICI Soda Ash Products, Mar. 1990.

Piers, et al., "Enhanced Performance of Composite Materials Under Fire Conditions", Polymers In a Marine Environment Conference, London, Oct. 1991.

Stueflotten, "Development and a Fire-Resistant Optical Cable", Journal of Lightwave Technology, Aug. 1986.

*Primary Examiner*—John D. Lee
*Assistant Examiner*—John Ngo
*Attorney, Agent, or Firm*—E. W. Somers

[57] ABSTRACT

A communications cable (20) in which plastic material which is disposed about each transmission medium thereof is characterized by a relatively low dielectric constant. The cable exhibits relatively low flame spread and low smoke generation while maintaining circuit integrity through a fire retardant composition which includes a mixture of an organic resin and first and second inorganic oxide constituents. The first inorganic oxide constituent is characterized by a melting point in the range of about 350° C. The second inorganic oxide constituent comprises a higher melting devitrifying frit which begins to crystallize at about 650° C. Advantageously, when the cable is exposed to high temperatures, the mixture of the first and second inorganic oxide constituents melts and forms a crusty layer which is interposed between the covering plastic material and other components of the cable.

23 Claims, 2 Drawing Sheets

CABLE HAVING SUPERIOR RESISTANCE TO FLAME SPREAD AND SMOKE EVOLUTION

TECHNICAL FIELD

This invention relates to a cable having superior resistance to flame spread and smoke evolution. More particularly, the invention relates to a cable which, because it has superior resistance to flame spread and smoke evolution, is ideally suited for telecommunications use in building risers or plenum shafts and more generally in any high fire rated application which includes a cable having relatively flammable inner material components.

BACKGROUND OF THE INVENTION

In the construction of many buildings, a finished ceiling, which is referred to as a drop ceiling, is spaced below a structural floor panel that is constructed of concrete, for example. The drop ceiling supports light fixtures and other ceiling-mounted items, while the space between the ceiling and the structural floor from which it is suspended serves as a return-air-plenum for elements of heating and cooling systems as well as a convenient location for the installation of communications, computer and alarm system cables. It is not uncommon for these plenums to be continuous throughout the length and width of each floor.

When a fire occurs in an area between a floor and a drop ceiling thereabove, it may be contained by walls and other building elements which enclose that area. However, when and if the fire reaches the plenum, and if flammable material occupies the plenum, the fire can spread quickly through an entire story of the building and smoke can be conveyed through the plenum to adjacent areas. The fire could travel along the length of communications cables which are installed in the plenum and which comprise a plurality of conductors individually insulated with plastic material and enclosed in a jacket comprising a plastic material.

Because of the possibility of such flame spread and smoke evolution, particularly when aided by flammable insulation of cables, the 1975 edition of the National Electric Code (NEC) prohibited the use of electrical cables in plenums unless they were enclosed in metal conduits. Because rigid metal conduits are difficult to route in plenums congested with other items, a rearrangement of office telephones, which in some companies has almost become an annual event, is extremely expensive. However, the code permits certain exceptions to this cost prohibitive requirement. For example, flame retardant, low smoke producing cables without metallic conduit are permitted provided that such cables are tested and approved by an authority such as the well known Underwriters Laboratories.

Also, in buildings, cables are needed for use in riser shafts. Such cables should not be too heavy, otherwise, it may become difficult to pull long lengths over several stories. Acceptable riser cables also are governed by requirements set forth by the Underwriters Laboratories.

What is needed is a cable for use in buildings which is relatively inexpensive to manufacture, but which meets the NEC requirements for flame retardance and smoke evolution, and which has excellent mechanical properties, particularly mechanical flexibility.

In the marketplace, cable which comprises a core having a paper core wrap and enclosed in a relatively thick metallic shield is available, but it is relatively inflexible and somewhat difficult to maneuver in plenums. Moreover, care must be taken during installation to guard against possible electrical shock which may be caused by the metallic sheath of the above-described cable engaging exposed electrical service wires or equipment in a plenum. Also, while the above-described cable meets flame spread requirements of the code, the snugness with which the metallic shield encloses the conductors prevents a charring of the conductor insulation that could effectively seal off a portion of the cable about the flame and reduce the evolution of smoke. Fluoropolymer plastic material has been accepted as the covering material for plenum cable without the use of metal conduit, but it is relatively expensive and is difficult to process. Fire retardant polyvinyl chloride based materials are currently evolving as plenum grade materials, but typically they have much higher dielectric constants than fluoropolymers used as insulation materials.

One approach to the problems of flame spread and smoke evolution is to include a barrier layer in a cable. The prior art includes a cable having a barrier layer that is made of an inorganic, cellular material and that encloses the core, and a metallic barrier having longitudinal edge portions that form a seam. In order to be able to reflect radiant heat outwardly, an outwardly facing major surface of the metallic barrier has an emissivity in the range of about 0.039 to 0.057. The metallic barrier is covered with an inner tape comprising a thermosetting material having at least translucent optical clarity and having a relatively low thermal diffusivity which in a preferred embodiment is in the range of about 0.0008 to 0.001 cm$^2$/sec., and a second tape which is identical to the inner tape. The inner and the outer tapes are wrapped about the metallic barrier to form overlapped seams which are sealed. Such a cable is disclosed in U.S. Pat. No. 4,284,842 which issued on Aug. 18, 1981 in the names of C. J. Arroyo, N. J. Cogelia, and R. J. Darsey.

Another disclosure of a barrier material which includes ethylene copolymers with enhanced fire resistant properties appears in European Patent Application 0 248,404 which was filed Jun. 2, 1987 and which is incorporated by reference hereinto. The composition includes an ethylene copolymer, a mixture of aluminum trihydrate and calcium carbonate or calcium-magnesium carbonate or both and a phosphate ester. Optimally, the composition may include a borosilicate glass. The phosphate ester increases the flexibility of the composition. As the material decompresses or burns, the aluminum and calcium constituents form a ceramic ash that has a cell structure. As the ash builds up, the ash becomes a thermal insulator. The borosilicate glass acts to harden the ash at lower temperatures than those that normally activate the Ca-Al complex.

One of the problems in providing a superior flame retardant communications cable is that of meeting properties which run counter to each other. A desired property for an insulation material is a relatively low dielectric constant. This becomes important in today's world in which higher transmission frequencies and bit rates are demanded by customers. However, insulating materials of the prior art, such as polyethylene, for example, which exhibit a relatively low dielectric constant, do not have suitable resistance to flame spread and smoke evolution.

A conventional solution to the use of organic resins which are desirable from the standpoint of electrical properties is to include additives which delay establishment of a fire. Such a solution has limitations. Flame retardant additives only delay the onset of a fire and lose their effectiveness once the temperature exceeds a critical threshold. Also, the use of halogenated and phosphorous flame retardants may cause evolution of smoke which includes corrosive gases. Further, the addition of low molecular weight halogenated or phosphorous constituents may lead to a plasticizing effect on the mechanical behavior of the resultant material. Mineral fillers added to provide flame retardancy may compromise the mechanical properties of the resultant material and most certainly will compromise the electrical properties. Typically, the better the fire resistance of typically used plastic cable materials, the higher the dielectric constant because of the required inclusion of additive systems. Presently, there appears to be no widely accepted way in which to use polyolefin insulation with a low percent of additives in a high fire environment.

Although inexpensive halogenated plastic materials are fire retardant, they do not have the dielectric properties which are desired. For example, polyvinyl chloride (PVC) materials may be used for plenum cables, but they have a relatively high dielectric constant.

An additional desired property of both insulating and jacketing compositions is the absence of intrinsic or added halogens which may be based upon the desire to reduce corrosive combustion gases. For example, in optical fiber cables, the concern shifts away from the dielectric constant to corrosivity. In such cables, inasmuch as the dielectric constant is not of concern, non-halogenated materials may be sought after to avoid the problem of corrosivity.

What is desired and what seemingly is not provided in the prior art is a cable in which transmission media are covered with a plastic material dictated by electrical or other properties such as, for example, one which exhibits a desirably low dielectric constant and which cable also exhibits suitable resistance to flame spread and smoke generation. The sought after cable desirably is reasonable in cost and relatively easy to process.

SUMMARY OF THE INVENTION

The foregoing problems of the prior art have been overcome by the cable of this invention. A fire retardant communications cable comprises a core which comprises at least one transmission media and fire retardant means which includes a material which comprises a mixture of a first inorganic oxide constituent and a second inorganic oxide constituent. The first inorganic oxide constituent is characterized by melting when exposed to temperatures as low as about 350° C. whereas the second inorganic oxide constituent begins to crystallize at about 650° C. The fire retardant means is effective when said cable is exposed to temperatures in the range of about 350° C. to 1000° C. to form a crusty layer which insulates said core from heat energy and minimizes release of smoke and combustible gases.

The fire-retardant means may take several forms. For example, it may be included as a jacket of the cable or as a longitudinally extending tape. Preferably, the fire retardant means is coextruded with the jacket.

BRIEF DESCRIPTION OF THE DRAWING

Other features of the present invention will be more readily understood from the following detailed description of specific embodiments thereof when read in conjunction with the accompanying drawings, in which.

DETAILED DESCRIPTION

Figure 1:
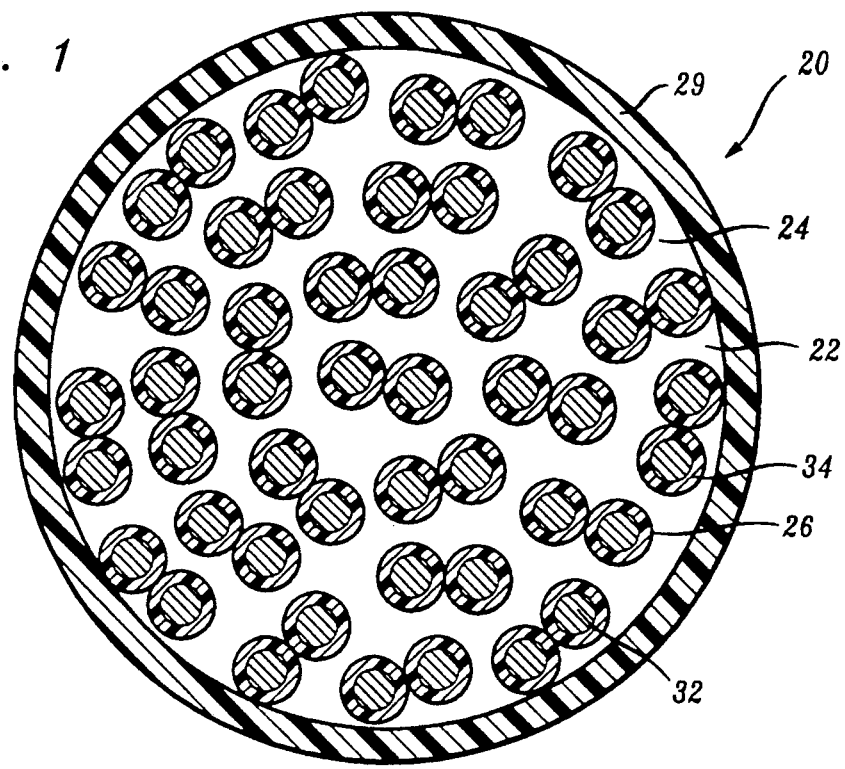
FIG. 1 is an end view of a cable which is structured in accordance with this invention and which has superior flame and smoke retardance properties.
Figure 2:
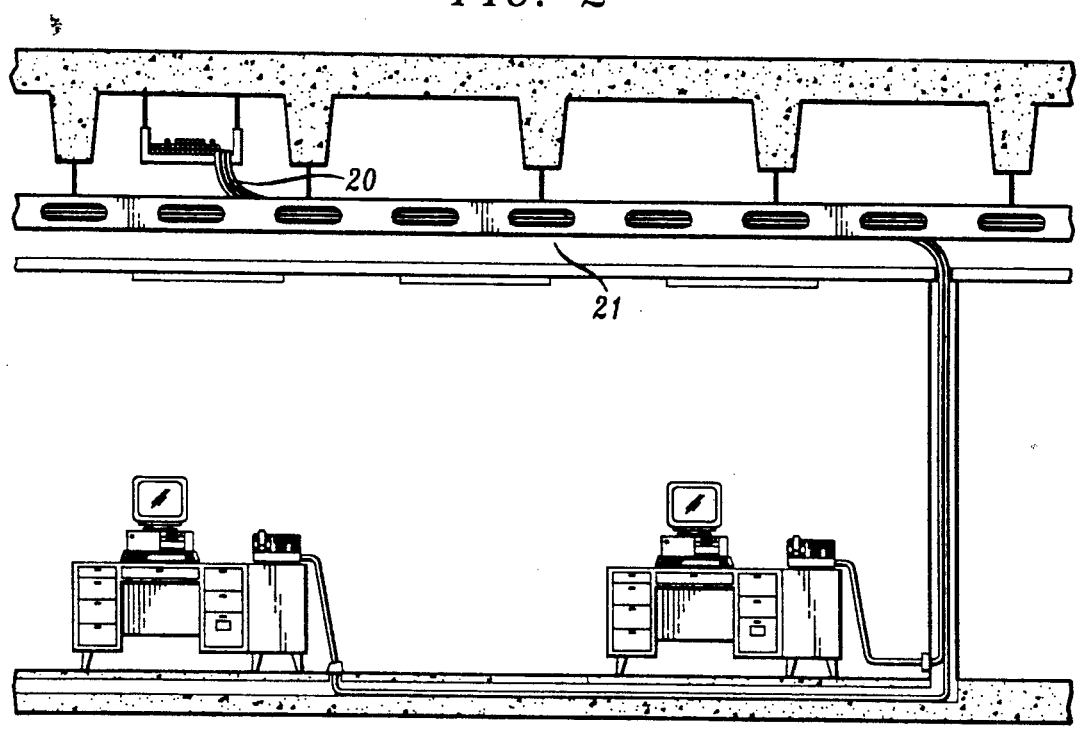
FIG. 2 is an elevational view of a portion of a building to show an environment in which the cable of this invention may be used.

Referring now to FIG. 1, there is shown a cable which is designated generally by the numeral 20. The cable may be used on a customer's premises such as for example in a plenum 21 (see FIG. 2) of a building. Also, the cable 20 may be used in a building riser (not shown). Further, the cable could be used in less stringent fire categories as designated by the NEC.

As is seen in FIG. 1, the cable 20 includes a core 22 which comprises one or more transmission media such as one or more pairs 24—24 of insulated metallic conductors 26—26 or optical fibers (not shown). Over the core 22 is disposed a jacket 29 which is made of a plastic fire resistant material.

Each of the insulated metallic conductors comprises a longitudinally extending metallic conductor 32 and an insulative cover 34. Desirably, the insulative cover 34 is made of a material such as polyethylene, for example, which has a relatively low dielectric constant, $\epsilon$. An acceptable material for use as the insulation cover is polyethylene or copolymers thereof. Application for optical fiber cables may also include buffer materials with particularly desirable mechanical properties such as, for example, engineering thermoplastics.

As is well known, polyethylene does not have acceptable fire retardant properties. An obvious solution to the dilemma of providing an acceptable dielectric constant in addition to flame retardant properties would be to compromise on one or both properties. Cables of this invention compromise neither desired property.

The cable of this invention overcomes the problem of competing properties by causing the cable to include a barrier which is disposed between a fire source and the plastic insulation. The barrier of the embodiment in FIG. 1 is included in the jacket 29.

The barrier of this invention includes an organic base resin and an additive system. The base resin may comprise a polymer material, a polyvinyl chloride (PVC) or a rubber. The polymer material may be an organic polymer such as polyethylene or a copolymer of ethylene with one or more comonomers selected from the group consisting of propylene, butylene, pentene, hexene, $C_1$ to $C_6$ alkyl acrylates or alkyl methacrylates, acrylic acid, methacrylic acid and vinyl acetate.

The additive system includes at least a first inorganic oxide constituent having a relatively low melting point and a second inorganic oxide devitrifying constituent having a relatively high melting point. The low temperature melting first inorganic oxide constituent of the additive system begins to melt at a much lower temperature, i.e., about 350° C. to 450° C., than typical glasses. See British patent GB 2220208 which is incorporated by reference hereinto. The inorganic oxide constituents may be referred to as frits. In a preferred embodiment, the composition of this invention includes an additive system which comprises a blend of vitreous and ceramic materials.

Glasses which may be used as the low melting first inorganic oxide constituent of the additive system include phosphate glasses such as inorganic oxide glasses having the following mole percent composition: 1.2 to 3.5% $B_2O_3$, 50 to 75% $P_2O_5$, 0 to 30% PbO and 0 to 5% of at least one oxide selected from the oxides of Cu, Ag, Au, Sc, Y, La, Ti, Zr, Hf, V, Nb, Ta, Cr, Mo, W, Mn, Tc, Re, Fe, Co, Ni, Ru, Rh, Pd, Os, Ir, Pt, Ce, Pr, Nd, Pm, Sm, Eu, Gd, Tb, Dy, Ho, Er, Tm, Yb, Lu, Th, Pd, and U, and which glass includes at least one oxide selected from alkali metal oxides and at least one oxide selected from alkaline earth metal oxides and zinc oxides. Preferred lead oxide containing glasses are made when the lead oxide ranges from 10 to 30 mole percent and the $P_2O_5$ in the composition ranges from 50 to 58 mole percent. See U.S. Pat. No. 4,079,022 which is incorporated by reference hereinto.

The higher melting point, second inorganic oxide constituent is a devitrifying frit that crystallizes, that is, passes from a glassy to a crystalline state, at a temperature between about 650° C. and 1000° C. and forms the crusty layer which seals off the inner portion of the cable. Desirably, the second inorganic oxide constituent remains hard up to a temperature of about 1100° C. The second inorganic oxide constituent may be a chopped ceramic fiber and/or basalt fiber. A preferred ceramic fiber is polycrystalline mullite fiber ($Al_2O_3/SiO_2$). See British patent GB 2220208.

A commercially available material which is a blend of vitreous and ceramic materials is one which is known as Ceepree fire barrier filler and which is marketed by ICI. Such a material is described in a paper authored by A. S. Piers and entitled "Enhanced Performance of Composite Materials Under Fire Conditions" presented at Polymers in a Marine Environment conference in London on Oct. 23-24, 1991. Such a material is described also in a paper presented in Vol. 11 of Proceedings of the Second Conference on *Recent Advances in Flame Retardancy of Polymeric Materials* held on May 14-16, 1991, and edited by M. Levin and G. S. Kirshenbaum, copyright 1991 by Buruss Communications Co., Inc. Also, it is disclosed in a brochure distributed by ICI Soda Ash Products dated May 1990, which documented a presentation given in London, England on Jan. 17-18, 1990.

The additive system also may include other constituents. For example, included may be a hydrated constituent or hydroxide or carbonate of a di-or trivalent metal. This constituent releases water vapor or carbon dioxide endothermically during decomposition which serves to retard the spread of fire by cooling the substrate and diluting combustible gases. Also included may be an additive such as an inorganic phosphate or an organic phosphate that is used to enhance char formation. The phosphate may intumesce, that is, cause swelling, with charring due to the inclusion of a blowing agent. Other constituents which may be included are zinc borate which both releases water vapor and acts as an additional barrier-forming encapsulant while reducing smoke evolution, mica which provides a heat barrier and transition metal complexes which provide fire retardant synergism with the hydrated metal compositions. These other constituents of the additive system decompose when subjected to intense heat and high-temperatures to provide a rigid foam of ceramic ash, for example, which is composed of a mass of cells. The cells help to provide a barrier against heat transfer.

Also, as mentioned hereinbefore, the glass filaments or particulates in cables of this invention begin to melt when exposed to a temperature in the range of about 350° C. This is a variation from typical glass formulations which melt in the range of 1500° C. Further, the glass filaments do not remelt under normal fire temperatures.

This melting causes a flow of the vitreous material about the burning base resin. The burning resin or portions thereof which have not yet decomposed are encapsulated. As a result of such encapsulation, access of the core to oxygen is inhibited which inhibits carbonaceous decomposition products from being emitted as smoke. A very stable char structure is provided and the smoke yield is reduced. The first inorganic oxide constituent encapsulates and fuses with combustible material, char, reinforcing fibers and any fillers.

Also, as mentioned hereinbefore, at higher temperatures of about 650° C. and beyond, the higher melting point second inorganic oxide constituent devitrifies, that is, it passes from a glassy to a crystalline state. As a result, the viscosity of the additive increases and the composition cures into a solid form. As the second frit hardens, it holds together char from the organic base resin. The result is a hard, protective barrier layer. The crusty layer prevents the passage of smoke, toxic fumes and flames. As a result, flame spread and smoke evolution are inhibited. The barrier layer thus encapsulates and fuses with combustible material, char, reinforcing fibers and any fillers. The resulting crystalline structure provides thermal protection up to a temperature of about 1100° C.

The blend of vitreous and ceramic materials does not delay ignition but in cooperation with the base resin resists penetration of heat energy while maintaining the circuit integrity of the cable. The delay of ignition may be accomplished by the inclusion of the aforementioned charring and hydrated additives.

A glass-ceramic mixture may be embodied in the cable 20 in any of several other ways. For example, the mixture may be included in a tape in which glass filaments or particulates are impregnated with an adhesive material to hold the glass together. In the alternative, the glass filaments or particulates may be coextruded with another plastic material which is used in the cable. For example, in an optical fiber cable, the glass could be coextruded with the core tube which comprises a tubular plastic member which enclose the core of optical fibers.

Figure 3:
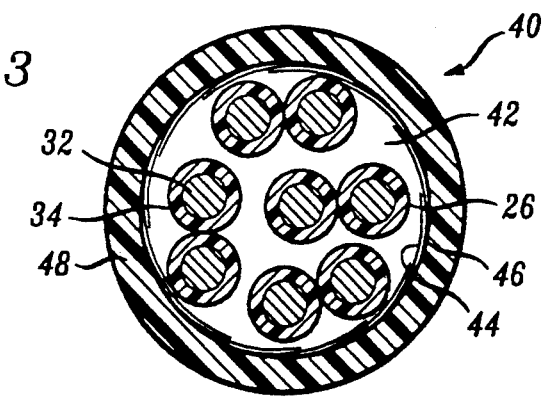
FIG. 3 is an end view of a cable of this invention.
Figure 4:
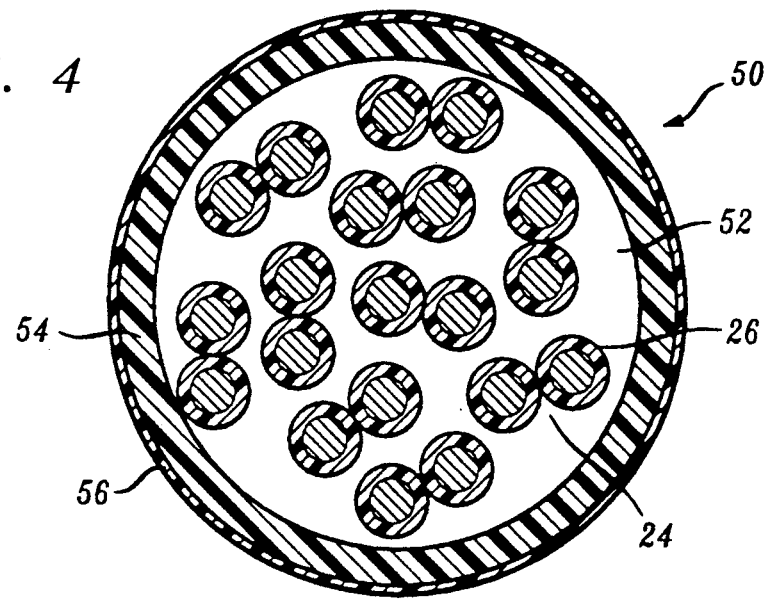
FIG. 4 is an end view of a preferred embodiment of the invention.
Figure 5:
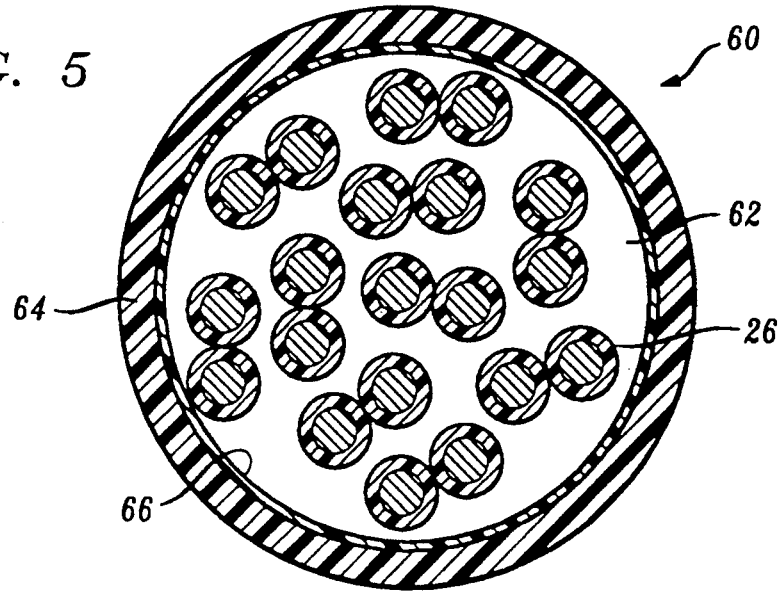
FIG. 5 is an end view of another embodiment of the invention.

Other embodiments include those shown in FIGS. 3, 4 and 5. In FIG. 3, there is shown an embodiment of the cable of this invention which is designated generally by the numeral 40. The cable 40 includes a core 42 which includes a plurality of pairs of insulated conductors 26—26, each of which includes a metallic conductor 32 and an insulation cover 34. The core 42 is enclosed in a tape 44 which has been wound helically or longitudinally (not shown) about the core to form a longitudinal overlapped seam 46. Enclosing the tape 44 is a jacket 48 which comprises a plastic material such as fire retardant polyethylene or copolymers thereof or polyvinyl chloride. Of course, a cable of this invention may include optical fibers (not shown) with or without metallic conductors.

The tape 44 provides a barrier layer to prevent the passage of combustible gases and smoke. The tape 44 comprises a base resin such as thermoplastic polyethylene or copolymers thereof, polyvinyl chloride or typical cured systems such as epoxy and an additive system. Included in the additive system is a low melting point frit such as the previously described glasses which begin to melt at about 350° C. and a higher melting point devitrifying frit which crystallizes and provides a crusty layer.

Another embodiment of the cable of this invention is shown in FIG. 4. A cable designated generally by the numeral 50 includes a core 52 comprising one or more pairs 24—24 of insulated metallic conductors 26—26 or optical fibers (not shown). Over the core is disposed a jacket 54 which is made of a plastic material such as polyethylene or copolymers thereof, polyvinyl chloride or EPDM rubber, for example. Disposed about the plastic jacket 54 is a layer 56 which is destined upon exposure to temperatures of at least 350° C. to form a barrier layer. The layer 56 may be applied as a coating or it may be coextruded along with the jacket 54. For particular applications, a cable 60 (see FIG. 5) which includes a core 62 and a jacket 64 may include a coextruded barrier layer 66 in engagement with an inner surface of the jacket.

For the embodiment of FIG. 1, the jacket comprises about 10 to 50% by weight of a polymeric base material, about 5 to 60% of an additive system exclusive of the inorganic oxide constituents and about 5 to 40% of the inorganic oxide constituents. Should the tape of FIG. 3 be used, the tape includes about 1 to 30% by weight of a polymeric base material, about 5 to 60% of additives and about 5 to 50% of the inorganic oxide constituents. When a coating or a coextruded layer such as is shown in FIG. 4 or FIG. 5 is used, the weight percent of each constituent will depend on properties of the cable such as, for example, the mechanical properties which are desired. A typical composition for the coextruded barrier layer includes about 10 to 50% of a polymeric base material, about 5 to 70% of an additive system exclusive of the inorganic oxide constituents and about 5 to 60% of the inorganic oxide constituents.

The barrier system of this invention permits the use in the core of cable materials which have very favorable dielectric properties and which are relatively inexpensive but which are not as flame retardant as desired such as, for example, in TEFLON plastic. Advantageously, with the barrier system of this invention, favorable dielectric materials may be used in the core and the jacket or tape or coextruded jacket provides a barrier to seal off the core and prevent flame spread and smoke convolution. Of course, if a coextruded layer or coating on the jacket is used, the entire underlying cable including the jacket is sealed.

Advantageously, the function of the barrier layer of the cable of this invention is dissimilar to that of flame retardant additives. It does not always delay ignition, but what it does do is to cause the host material, i.e. the polymer material, to be able to resist the penetration of fire and release of associated smoke and combustibles while moderating any loss of integrity and associated mechanical properties.

It is to be understood that the above-described arrangements are simply illustrative of the invention. Other arrangements may be devised by those skilled in the art which will embody the principles of the invention

I claim:

1. A fire retardant communications cable, said cable comprising
   a core which comprises at least one transmission media; and
   fire retardant means which includes a material which comprises a mixture of a first inorganic oxide constituent which is characterized by melting when exposed to temperatures of at least about 350° C. and inorganic oxide constituent which begins to crystallize at about 650° C. and an organic base resin, said fire retardant means being effective when said cable is exposed to temperatures in the range of about 350° C. to 1000° C. to form a crusty layer which insulates said core from heat energy and minimizes the evolution of combustible gases and smoke.

2. The cable of claim 1, which also includes an outer jacket wherein said outer jacket includes an organic plastic resin matrix in which are dispersed said first and said second inorganic oxide constituents.

3. The cable of claim 2, wherein said plastic resin of said outer jacket is selected from the group consisting of polyvinyl chloride, polyolefin, polyurethane and copolymers thereof.

4. The cable of claim 3, wherein said polyolefin is selected from the group consisting of polyethylene and polypropylene.

5. The cable of claim 3, wherein said copolymers include comonomers selected from the group consisting of propylene, butylene, pentene, hexene, $C_1$ to $C_6$ alkyl acrylates or alkyl methacrylates, acrylic acid, methacrylic acid and vinyl acetate.

6. The cable of claim 1, wherein said fire-retardant means includes additional additives which are selected from the group consisting of a hydrated metal constituent, hydroxide or carbonate of a di- or trivalent metal, inorganic phosphates, organic phosphates, zinc borate, mica and transition metal complexes.

7. The cable of claim 1, wherein said first inorganic constituent comprises about 1.2 to 3.5% of $B_2O_3$, 50% to 72% of $P_2O_5$, 0 to 30% of PbO, and 0 to 5% of at least one oxide selected from the group consisting of oxides of Cu, Ag, Au, Sc, Y, La, Ti, Zr, Hf, V, Nb, Ta, Cr, Mo, W, Mn, Tc, Re, Fe, Co, Ni, Ru, Rh, Pd, Os, Ir, Pt, Ce, Pr, Nd, Pm, Sm, Eu, Gd, Tb, Dy, Ho, Er, Tm, Yb, Lu, Th, Pd, and U.

8. The cable of claim 1, wherein said second inorganic constituent is a ceramic constituent.

9. The cable of claim 8, wherein said ceramic constituent comprises polycrystalline mullite fiber.

10. The cable of claim 1, wherein said cable includes an outer jacket which comprises a plastic material and a longitudinally extending tape which has been wrapped about said core, said longitudinally extending tape including said fire-retardant means.

11. The cable of claim 10, wherein said outer jacket is comprised of a plastic material which is selected form the group consisting of polyethylene, copolymers of polyethylene, polyvinyl chloride and EPDM rubber.

12. The cable of claim 10, wherein said first inorganic oxide constituent comprises 1.2 to 3.5% of $B_2O_3$, 50 to 72% of $P_2O_3$, 0 to 30% PbO and 0 to 5% of at least one oxide selected from the group consisting of oxides of Cu, Ag, Au, Sc, Y, La, Ti, Zr, Hf, V, Nb, Ta, Cr, Mo, W, Mn, Tc, Re, Fe, Co, Ni, Ru, Rh, Pd, Os, Ir, Pt, Ce, Pr, Nd, Pm, Sm, Eu, Gd, Tb, Dy, Ho, Er, Tm, Yb, Lu, Th, Pd and U.

13. The cable of claim 10, wherein said second inorganic oxide constituent is a ceramic constituent.

14. The cable of claim 13, wherein said ceramic constituent comprises polycrystalline mullite fiber.

15. The cable of claim 10, wherein said tape comprises a substrate which has been treated with said fire retardant means.

16. The cable of claim 1, which also includes an outer jacket and a barrier layer which is contiguous with said outer jacket, said barrier layer including said fire retardant means.

17. The cable of claim 16, wherein said barrier layer has been coated about an outer surface of said outer jacket.

18. The cable of claim 16, wherein said barrier layer comprises a layer of material which has been coextruded with said outer jacket about said core.

19. The cable of claim 18, wherein said barrier layer comprises a layer of material which is in engagement with an outer surface of said outer jacket.

20. The cable of claim 18, wherein said barrier layer comprises a layer of material which is in engagement with an inner surface of said outer jacket.

21. The cable of claim 16, wherein said jacket comprises a plastic material selected from the group consisting of polyethylene, copolymers of polyethylene, polyvinyl chloride and EPDM rubber.

22. The cable of claim 16, wherein said first inorganic oxide constituent comprises 1.2 to 3.5% of $B_2O_3$, 50 to 72% of $P_2O_5$, 0 to 30% PbO and 0 to 5% of at least one oxide selected from the group consisting of oxides of Cu, Ag, Au, Sc, Y, La, Ti, Zr, Hf, V, Nb, Ta, Cr, Mo, W, Mn, Tc, Re, Fe, Co, Ni, Ru, Rh, Pd, Os, Ir, Pt, Ce, Pr, Nd, Pm, Sm, Eu, Gd, Tb, Dy, Ho, Er, Tm, Yb, Lu, Th, Pd and U.

23. The cable of claim 16, wherein said second inorganic oxide constituent is a ceramic constituent.

* * * * *